W. J. OLDROYD.
ELEVATING TRUCK.
APPLICATION FILED MAR. 16, 1914.
1,135,545.
Patented Apr. 13, 1915.
2 SHEETS—SHEET 1.
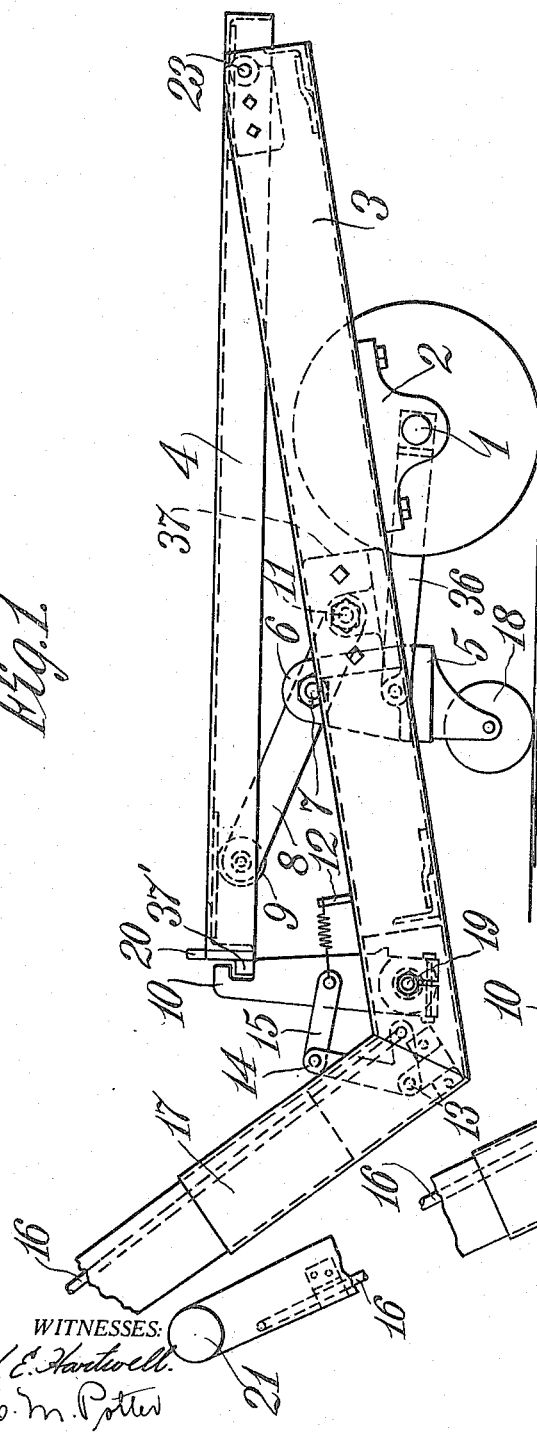
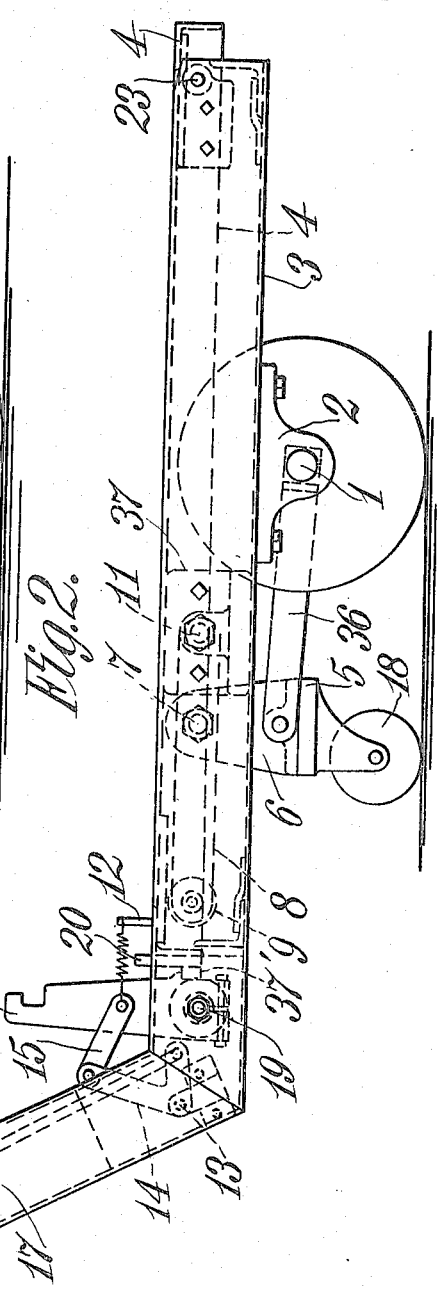
WITNESSES:
H. E. Hartwell.
G. M. Potter
INVENTOR.
Walter J. Oldroyd.
BY
Chapin & Co.
ATTORNEYS

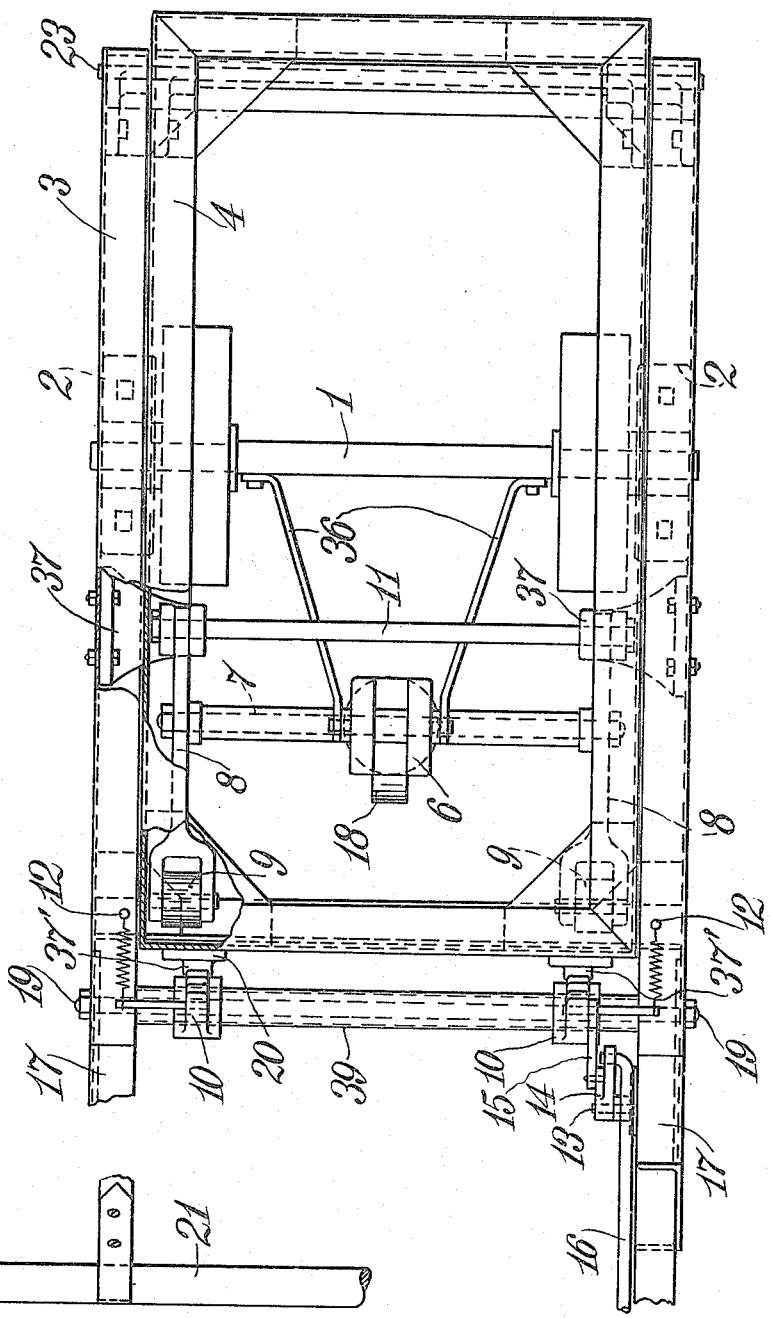

UNITED STATES PATENT OFFICE.

WALTER J. OLDROYD, OF HARTFORD, CONNECTICUT, ASSIGNOR TO GEORGE P. CLARK COMPANY, OF WINDSOR LOCKS, CONNECTICUT, A CORPORATION OF CONNECTICUT.

ELEVATING-TRUCK.

1,135,545.

Specification of Letters Patent.

Patented Apr. 13, 1915.

Application filed March 16, 1914. Serial No. 824,854.

*To all whom it may concern:*

Be it known that I, WALTER J. OLDROYD, a citizen of the United States of America, residing at Hartford, in the county of Hartford and State of Connecticut, have invented new and useful Improvements in Elevating-Trucks, of which the following is a specification.

This invention relates to an elevating truck, that is, a truck including a main frame mounted on two or more wheels and a load supporting member movable vertically with relation to the main frame whereby loads may be elevated by the truck and by loads may be elevated by the truck and transported as a unit. The type of truck shown herein is especially adapted for transporting light loads.

The object of the invention is to provide a truck of the kind described having improved mechanical means for operating the load supporting member of the truck to elevate it.

More particularly, the object of the invention is to provide a frame preferably, but not necessarily, connected for operation with the truck handle, said frame being fulcrumed preferably, but not necessarily, on one axle of the truck and operably connected with the load supporting member and the truck so that a tipping of said frame on its fulcrum will lift and maintain said member in horizontal position during the lifting operation.

Other objects of the invention will appear in the detailed description and annexed claims.

One preferred embodiment of the invention is shown herein for the purpose of illustrating one manner of carrying out the invention.

Reference is made to the accompanying drawings in which—

Figure 1 is a side elevation of the improved truck with a part of the handle broken away, showing the load supporting member in elevated position. Fig. 2 is a similar view showing the load supporting member in lowered position. Fig. 3 is a plan view partly in section, of the truck shown in Figs. 1 and 2.

The truck comprises a frame 3 which, as shown, is made up in the form of a rectangular frame suitably braced at the corners and rigidly connected with the handle arms 17, one extending upwardly from each front corner of the frame. This frame 3 has depending from each side member intermediate its ends a suitable bracket 2 through which the axle 1 is adapted to pass. On this axle 1, the main supporting wheels of the truck are mounted in any suitable manner, as indicated in the drawings. A supplemental supporting caster wheel 18 is mounted in the lower caster member 5 which is swiveled on the upper caster member 6. Reach bars 36, bolted to the axle 1, as shown best in Fig. 3, extend to the upper caster member 6 to brace and support the latter in front of the axle 1 and on the longitudinal dividing lines of the truck. These reach bars have pivotal connections to the caster member 6 so that the latter may rock slightly in a manner to be described.

The load supporting member 4 comprises a suitably braced rectangular frame similar to the frame 3. The member 4 is pivoted to the rear end of the frame 3 by means of a cross rod 23 having a suitable bearing in the frame 3 and the member 4, as indicated in Fig. 3. Slightly in front of the axle 1 and bolted to brackets 37, extending from the side bars of the frame 3, is cross-rod 11. At each side of this cross-rod is pivoted at the lower ends the levers 8, as indicated in Fig. 3. Connecting the levers 8 intermediate their ends is a suitable sleeve through which a cross-rod 7 passes, fastened by nuts as shown. This sleeve and cross-rod pass through and are supported by the upstanding portion of the caster device 6. The upper ends of each of the levers 8 are forked as indicated in Fig. 3 and have mounted in the forked ends the rolls 9 for a purpose to be described. Rolls 9 are adapted and arranged to bear against a suitable plate on the under side of the load supporting member 4 which plates are in effect a track for the rolls 9.

Extending between the forward ends of the side members of the frame 3 and fastened thereto is a rod 19. Loosely mounted on this rod is a sleeve 39 to which the two upstanding latch devices 10 are mounted for turning movement therewith in a manner to be described. Intermediate the ends of one of the upstanding arms 10 is pivoted a link 15, and the outer end of this link is pivoted to the upper end of a bell-crank lever 14 which lever is pivoted on pin 13 to one arm of the handle 17 of the truck at its lower end, as indicated in Figs. 2 and 3. At the outer end of the lower arm of the bell-crank lever 14 is pivoted a rod 16 suitably mounted and supported in the handle 17, as shown, for sliding movement therein. This rod 16 extends to the outer end of the handle arm so that it may be easily reached from the cross-bar 21 of the handle. A post 12 is mounted on one side of the frame 3 and to this post is connected a spring. The other end of this spring is connected to the latch 10 intermediate its ends for a purpose to be described.

With the foregoing description of the truck in mind, the operation is as follows— Referring to Fig. 2—If the operator, lowers the handle 17 the frame 3 at its rear end will swing upwardly, and, due to its pivotal connection with the rear end of the load supporting frame, the latter will also move upwardly into the position shown in Fig. 1. As the rear end of the load supporting means moves upwardly, the forward end will also move forwardly due to the lever connections 8 with the frame of the truck. It will be seen that as the forward end of the frame 3 is lowered, the outer ends of the levers 8 will also be lowered due to their pivotal connection with the rod 7. This causes the other ends of the levers 8 on which the rolls are mounted to be raised, and, because of the contact of the rolls 9 with the plates on the under side of the member 4, the latter will be raised equally with the rear end of the member 4. In this operation, the upper caster member 6 will rock slightly on its pivotal connections with reach bars 36 due to the changing distance between rods 7 and 11 in the lifting operation. The parts are so designed that the load supporting platform 4 will be raised and, at the same time, maintained in a horizontal position to properly support and balance the load. When the platform 4 has been moved upwardly to its full extent, the latch members 10 pivoted on the rod 19 will turn to the right, due to the spring before mentioned and the slots in the upper ends of the latch members will engage the projections 37' on the forward cross member of the platform 4. The parts are now in the position indicated in Fig. 1, and the operator can wheel the truck to any desired point. When it is desired to release the platform and lower it into the position indicated in Fig. 2, the operator pulls the rod 16 upwardly swinging the bell-crank lever 14 counter-clockwise to pull the latch devices 10 out of engagement with the projections 37'. The load will then tend to swing the frame and the handle in a clockwise direction, and the operator can control this lowering movement, as he grasps the cross-rod 21 of the handle. The load may thus be safely lowered.

While applicant has described one preferred form of his invention, it is to be understood that the invention may be carried out in many other forms without departing from the scope of the annexed claims.

What I claim is—

1. An elevating truck, comprising, in combination, supporting wheels, a frame pivotally mounted thereon intermediate its ends, a handle operably connected with the frame, a load supporting member operably connected with said frame at the rear thereof to be lifted thereby, and mechanism associated with the said member and frame for lifting the forward end of said member as the rear end is lifted, all constructed and arranged so that the load supporting member will be lifted at both ends by the pivotal movement of the frame without substantially shifting said member longitudinally with relation to said wheels.

2. An elevating truck, comprising, in combination, supporting wheels and a frame pivotally mounted thereon intermediate its ends, a load supporting member operably connected with said frame at the rear thereof to be lifted thereby, and mechanism associated with the said member and frame for lifting the forward end of said member as the rear end is lifted, all constructed and arranged so that the load supporting member will be lifted at both ends by the pivotal movement of the frame without materially shifting said member longitudinally with relation to said wheels.

3. An elevating truck, comprising, in combination, an axle with supporting wheels thereon, a caster frame having a supplementary supporting wheel swiveled thereon, distance bars fastened to said axle and to the caster frame, a main frame pivoted for vertical rocking movement on said axle, a load supporting member operably associated at one side of said axle with the frame to be lifted thereby, lifting means pivoted on the caster frame and operably associated with said frame and member at the other side of said axle, all constructed and arranged so that a rocking movement of the main frame in one direction will lift said load supporting member.

4. An elevating truck, comprising, in combination, an axle with supporting wheels thereon, a caster frame having a supplementary supporting wheel swiveled thereon, distance bars fastened to said axle and to the caster frame, a main frame pivoted for vertical rocking movement on said axle, a load supporting member operably associated at one side of said axle with the frame to be lifted thereby, lifting means pivoted on the caster frame and operably associated with said frame and member at the other side of said axle, means to hold the load supporting member in lifted position, all constructed and arranged so that a rocking movement of the main frame in one direction will lift said load supporting member.

5. An elevating truck, comprising, in combination, an axle with supporting wheels thereon, a frame pivoted intermediate its ends to said axle, comprising side and cross-bars having upturned handle extensions to rock the frame, a load supporting member connected to the rear end of said frame for movement therewith, mechanism arranged in front of said axle and operably connected to the frame and load supporting member, whereby when the handle extensions are lowered, the rear end of the frame and member will be raised and said mechanism will be operated to likewise lift the front end of said member, means to hold the front end of said member in elevated position together with mechanism to release said means.

6. An elevating truck, comprising, in combination, an axle having supporting wheels thereon, a caster frame arranged in front of the axle, reach bars fastened to the axle and pivoted to the caster frame, a main frame pivoted to the axle and having an upturned handle portion for tilting the frame, a load supporting member pivoted at its rear end to the rear end of the main frame, a lever pivoted to the caster frame intermediate its ends, said lever having one end pivoted to the main frame in front of the axle, and the other end arranged to bear against the forward under side of the load supporting member, constructed and arranged so that a downward movement of the handle portion will lift the load supporting member with the same speed at each end, an automatically operable latch to hold said member in elevated position, and a device for releasing the latch to permit said member to be lowered.

WALTER J. OLDROYD.

Witnesses:
JAMES D. OUTERSON,
H. E. HARTWELL.

Copies of this patent may be obtained for five cents each, by addressing the "Commissioner of Patents, Washington, D. C."